United States Patent [19]

Theno

[11] Patent Number: 4,826,712
[45] Date of Patent: May 2, 1989

[54] DECORATIVE RIBBONS

[76] Inventor: Mark H. Theno, 6833 Woodland Dr., Eden Prairie, Minn. 55344

[21] Appl. No.: 39,700

[22] Filed: Apr. 20, 1987

[51] Int. Cl.⁴ .............................................. D04D 7/10
[52] U.S. Cl. ...................................... 428/4; 428/352; 428/906
[58] Field of Search ...................... 428/4, 5, 906, 352

[56] References Cited

U.S. PATENT DOCUMENTS

| | | | |
|---|---|---|---|
| 1,276,731 | 8/1918 | Crowell | 428/906 X |
| 2,072,095 | 3/1937 | Cohn | 428/906 X |
| 2,450,083 | 9/1948 | Donaldson | 428/40 |
| 2,626,883 | 1/1953 | Boese | 428/4 X |
| 2,641,562 | 6/1953 | Chartrand et al. | 428/352 X |
| 3,241,662 | 3/1966 | Robinson et al. | 428/910 X |
| 3,256,129 | 6/1966 | Wallerstein et al. | 428/5 |
| 3,475,259 | 10/1969 | Meserole | 428/352 X |
| 3,922,407 | 11/1975 | Nimmo et al. | 428/5 |
| 4,138,527 | 2/1979 | Malek | 428/345 X |
| 4,421,817 | 12/1983 | Pina et al. | 428/352 X |
| 4,576,854 | 3/1986 | Kurahashi | 428/906 X |
| 4,585,676 | 4/1986 | De Smet et al. | 428/5 |
| 4,670,012 | 6/1987 | Johnson | 604/389 X |
| 4,680,210 | 7/1987 | Corcoran | 428/194 X |
| 4,696,854 | 9/1987 | Ethier | 428/284 X |
| 4,708,907 | 11/1987 | Flutti et al. | 428/352 |
| 4,781,306 | 11/1988 | Smith | 428/206 X |

Primary Examiner—Henry F. Epstein
Attorney, Agent, or Firm—Jacobson and Johnson

[57] ABSTRACT

A decorative gift wrapping ribbon having a top decorative surface and a lower surface containing a layer of pressure-sensitive adhesive with the pressure-sensitive adhesive having sufficient adhesive strength to prevent accidental displacement of the ribbon on the package, yet having sufficient lack of adhesiveness so that if the ribbon is positioned improperly it can be correctly repositioned on the package without tearing the package.

7 Claims, 1 Drawing Sheet

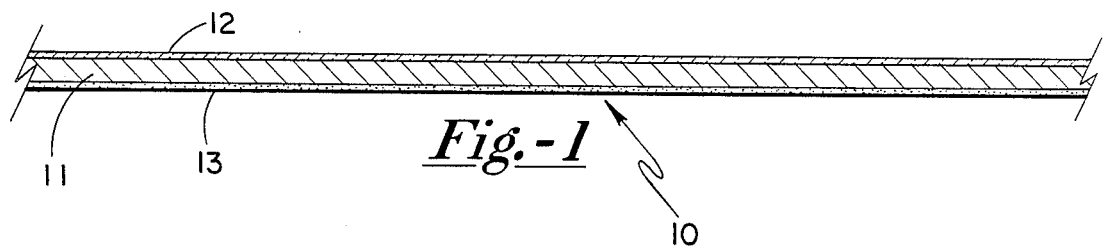
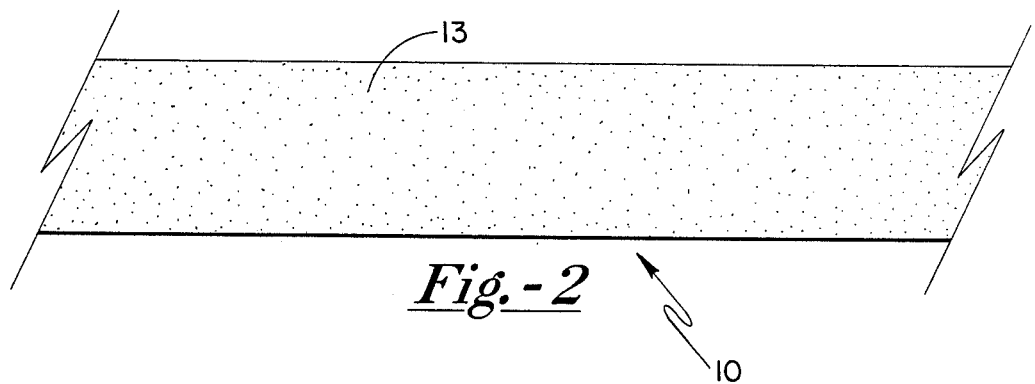
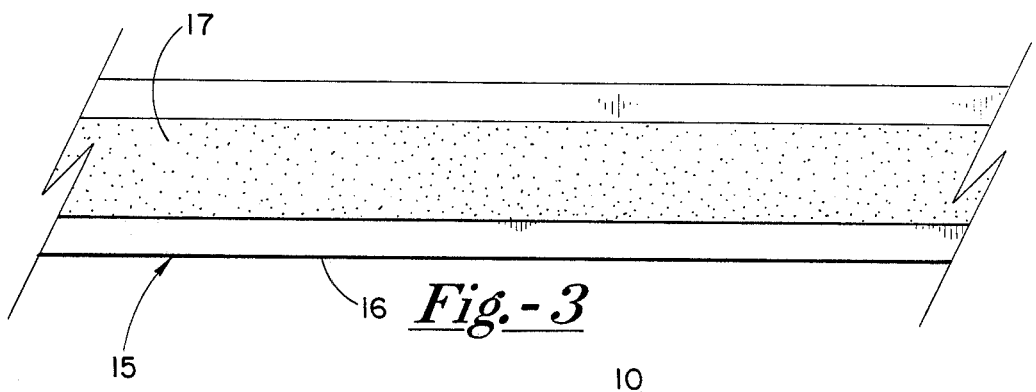
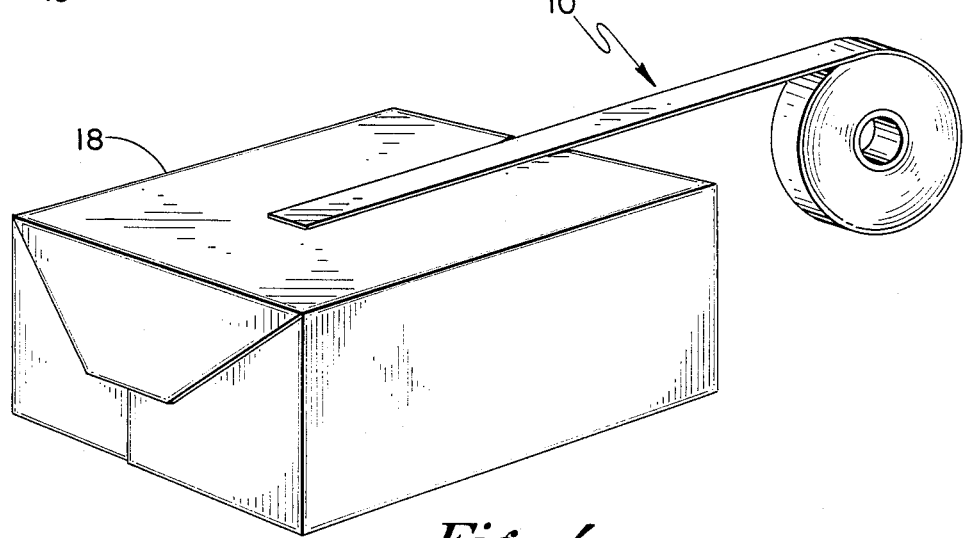

DECORATIVE RIBBONS

BACKGROUND OF THE INVENTION

1. Field of the Invention

This invention relates generally to decorative gift wrap ribbon and more specifically, to decorative gift wrap ribbon that lightly adheres to a gift wrap package to prevent displacement of the gift wrap ribbon during handling of the package.

2. Description of the Prior Art

The concept of decorative gift wrapping ribbons for wrapping gift packages is old in the art. Generally, after a package is wrapped with a decorative paper, a decorative and ornamental ribbons is wrapped lengthwise and crosswise around the package with the ends of the ribbon usually tied or taped together. The decorative and ornamental ribbon has a decorative appearance that usually enhances the appearance of the package. The available decorative ribbons usually have a solid bright color in a somewhat glossy finish. Most of the decorative ribbons comprise a thin base strip of either polypropylene or rayon acetate ribbon having a solid color or an ornamental decoration located on one side of the ribbon. Since the ribbons, through their decorative designs or their colorfulness, enhance the packages' appearance, it is necessary to maintain the decorative appearance of the ribbons.

Certain attempts have been made to enhance gift wrapping ribbon. For example, the Cohn U.S. Pat. No. 2,072,095 shows the use of reinforcing edge strips to prevent unravelling of the ribbon ends as well as to produce a more artistic and ornamental ribbon.

The present invention enhances the usefulness of a decorative gift wrapping ribbon without detraction from the ribbon's appearance by application of an adhesive to one side of the ribbon, and the application of a transparent release agent to the opposite side of the ribbon to permit one to unwind the gift wrap ribbon from a roll, much in the manner of unwinding conventional cellophane tape, however, the present invention should not be confused with cellophane tapes since it is for an entirely different purpose.

The difficulty with attempting to apply any foreign substance such as an adhesive to the ribbon is that the generally available ribbons have a porous structure that prevents applying material to the surface without having the material migrate through the ribbon. The Cohn U.S. Pat. No. 2,072,095 points out that through capillary action the adhesive is absorbed by the fabric and spreads irregularly throughout. Thus, if one applies a release agent or an adhesive to one side of the ribbon, the capillary action of the porosity of the ribbon permits migration of the release agents or adhesives through the ribbon. If the release agent penetrates the ribbon, it prevents application of a pressure sensitive adhesive to the opposite side of the ribbon. On the other hand, if the adhesive penetrates the ribbon, the decorative effect of the ribbon is lost. Also, if no release agent is used, the problem of "blocking" occurs that results in unusable ribbon. Blocking is caused by the migration of the adhesives through the porous ribbons, resulting in a roll of ribbon that cannot be unwound without tearing the ribbon. That is, over a period of time the adhesive permeates and attaches itself to the top surface of the ribbon, and thus prevents the ribbon from being unrolled without tearing the ribbon. Since the blocking problem increases as ribbon age, it is particularly difficult to make pressure-sensitive gift wrap ribbons that may only be used once or twice a year. The present invention provides a solution to the blocking problem for gift wrapping ribbon through use of a transparent liquid polymer release agent, which is polymerized directly on the decorative surface of the ribbon before the release agent penetrates the porous ribbon. The immediate polymerization of the release agent converts the release agent into a solid film that prevents the release agent from penetrating the porous ribbon. The insitu polymerization of the release agent converts the release agent to a flexible solid film, thus leaving the opposite ribbon surface clean to permit applying an adhesive thereto.

Other tapes, although not intended for gift wrapping, are known in the art, for example, the Kurahashi U.S. Pat. No. 4,576,854 shows a packaging tape for use in packaging or bundling materials having a self-adhesive layer that securly holds the tape to itself yet provides no adhesive to the packaging article.

The Meserole U.S. Pat. No. 3,475,259 shows a decorative multi-strip adhesive stripping tape of a two-ply stencil for applying on the bow of boats and the like.

The Chartrand, et al., U.S. Pat. No. 2,641,562 shows a decorative type of material that can be transferred onto a surface.

The Donaldson U.S. Pat. No. 2,450,083 shows the use of a treated paper liner for adhesive rolls.

The Crowell U.S. Pat. No. 1,276,731 shows a cloth gummed tape which is used for sealing cartons and packages.

The DeSmet, et al., U.S. Pat. No. 4,585,676 shows a bow form which can be formed by pulling a string located in a ribbonstrip.

It is also known that ornamental gift wrap ribbons can have the back side applied with some type of moistenable adhesive which must be moistened in order to stick to itself. However, none of these prior art ribbons provide a ribbon that can be quickly and easily secured and maintained in the proper position on the package.

BRIEF DESCRIPTION OF THE INVENTION

The present invention comprises improvement to decorative gift wrapping ribbon tapes comprising the combination of a decorative ribbon having a top decorative surface and a lower surface containing a layer of pressure-sensitive adhesive. The pressure-sensitive adhesive has sufficient adhesive strength to prevent lateral displacement of the ribbon on the package yet has sufficient lack of adhesiveness so that if the ribbon is positioned improperly, it can be correctly repositioned on the package without tearing the package.

BRIEF DESCRIPTION OF THE DRAWINGS

FIG. 1 shows a side view of a decorative ribbon of the present invention;

FIG. 2 shows a bottom view of the decorative ribbon of FIG. 1;

FIG. 3 shows the bottom view of an alternate embodiment of the invention; and

FIG. 4 shows the decorative ribbon of the invention being used to gift wrap a package.

DESCRIPTION OF THE PREFERRED EMBODIMENT

Referring to FIG. 1, reference numeral 10, generally identifies a self-adhering decorative ribbon of the present invention. FIG. 1 shows porous decorative ribbon in a greatly enlarged cross-sectional view having a bottom surface with a layer of pressure-sensitive adhesive 13. On the decorative top surface of ribbon 11 is a layer of transparent release material 12. Although ribbon 11 is porous, the releasing agent 12 does not penetrate through the ribbon.

FIG. 2 shows the lower surface of ribbon 11 with self-adhesive layer 13 extending entirely across lower surface of ribbon 11.

FIG. 3 shows an alternate embodiment of my gift wrapping ribbon in which ribbon 16 has a layer of self-adhesive 17 fastened over a portion of ribbon 16.

FIGS. 1-4 show a decorative ribbon for gift wrapping a package to prevent accidental displacement of the decorative ribbon during handling of the package.

The decorative ribbon comprises a strip of flexible material for wrapping around a package to enhance the appearance of the package. The strip of flexible material has a top decorative surface and a bottom surface. The top decorative surface has a visually decorative appearance and the bottom surface has a layer of pressure-sensitive adhesive located thereon for attaching the strip of flexible material to the package to prevent displacement of the strip of flexible material. The adhesive layer has an effective holding strength sufficiently strong to prevent accidental displacement of the ribbon on the package yet sufficiently weak so as to permit repositioning of the ribbon on the package without damaging the package.

FIG. 4 shows the ribbon in roll form and FIGS. 1-3 show the top decorative surface includes a flexible transparent film of release agent covering the top decorative surface to permit the ribbon to be unwound from the roll without marring the decorative surface of the ribbon.

The ribbon of the preferred embodiment is either polypropylene based material or rayon acetate material. These materials constitute the substantial portion of the decorative ribbon market since they provide strong, durable and very decorative appearing ribbons. The preferred adhesive used with the present invention is a pressure-sensitive hot melted adhesive.

I have found that for porous decorative ribbons such as those made of polypropylene or rayon acetate, the use of a backing release agent containing material such as a silicone, urethane, flurocarbon, acrylic emulsion or polyolefin materials are particularly useful. The release agent, which is prepared in a highly viscous liquid form, is coated directly on the top surface of the ribbon. Since the ribbon's porosity is very small and the release agent is viscous, the releasing agent does not immediately penetrate the ribbon. Once the release agent is coated on the top surface of the ribbon, the release agent is cured before the release agent has sufficient time to flow into the porous ribbon. The insitu curing of the release agent forms a transparent polymerized solid flexible film that tenaciously adheres to the top surface of the ribbon. A particularly useful insitu curing involves using electron beam curing by impacting the polymer release agent with high energy electrons to quickly cure the release agent into a thin flexibly polymerized transparent film. The polymerized transparent film prevents further flow or creep of the release agent during extended periods of non-use of the ribbon. Consequently, even though the pressure-sensitive adhesive may floww, the adhesive cannot penetrate the film because of the release agent. Thus, one is insured that the roll of ribbon will maintain its integrity and can be unwound and used at the next gift-wrapping season.

I have found that any number of adhesives, such as acrylic, hot melt, water-based or solid-based adhesives may be used in the invention, as long as they are compatible with the release agent and the ribbon. However, I prefer to use a pressure-sensitive hot melt adhesive which has 180 degree peel strength of about 26 pounds per square inch or less. This type of adhesive is generally referred to in the art as being a repositionable adhesive.

I claim:

1. A ribbon for gift wrapping a package to prevent accidental displacement of the ribbon during handling of the package comprising:
   a decorative ribbon comprising a strip of flexible material for wrapping around a portion of a package to enhance the appearance of the package, said strip of flexible material having a bottom surface, said strip of flexible material having a visually decorative appearance, said bottom surface having a layer of repositionable pressure-sensitive adhesive located thereon for attaching said strip of flexible material to the package to prevent the displacement of said strip of flexible material, said adhesive layer having an effective holding strength sufficiently strong to prevent accidental displacement of the ribbon on the package, said holding strength being sufficiently weak so as to permit repositioning of the ribbon on the package without damaging the package.

2. The invention of claim 1 wherein said ribbon is in roll form and the top decorative surface includes a flexible transparent film of release agent covering said top decorative surface to permit said ribbon to be unwound from the roll without marring the decorative surface of said ribbon.

3. The invention of claim 2 wherein said pressure-sensitive adhesive is located on a portion of said bottom surface.

4. The invention of claim 2 wherein said strip of flexible material is rayon acetate.

5. The invention of claim 2 wherein said strip of flexible material comprises polypropylene.

6. The invention of claim 4 wherein the release agent comprises a flexible polymer film.

7. A decorative gift wrap ribbon for gift wrapping a package to provide a decorative appearance on a package and to pevent accidental displacement of the ribbon during handling of a package, said decorative gift wrap ribbon comprising a thin strip of flexible polypropylene or rayon, said decorative gift wrap ribbon having a top surface and a bottom surface located thereon, said top surface having a visually decorative appearance, said bottom surface having a layer of repositionable pressure-sensitive adhesive located thereon for attaching said decorative gift wrap ribbon to a package to prevent displacement of said decorative gift wrap ribbon on a package, said adhesive layer having an effective holding strength sufficiently strong to prevent accidental displacement of said decorative gift wrap ribbon on a package, said holding strength being sufficiently weak so as to permit repositioning of said decorative gift wrap ribbon on a package without damaging a package; and
   a flexible transparent film of a release agent located on said top surface to permit said decorative gift wrap ribbon to be unwound from a roll of said decorative gift wrap ribbon without marring the top surface of said decorative gift wrap ribbon.

* * * * *

REEXAMINATION CERTIFICATE (3000th)

United States Patent [19]

Theno

[11] B1 4,826,712
[45] Certificate Issued Sep. 24, 1996

[54] DECORATIVE RIBBONS

[76] Inventor: Mark H. Theno, 6833 Woodland Dr., Eden Prairie, Minn. 55344

Reexamination Request:
No. 90/002,819, Aug. 24, 1992

Reexamination Certificate for:
Patent No.: 4,826,712
Issued: May 2, 1989
Appl. No.: 039,700
Filed: Apr. 20, 1987

[51] Int. Cl.$^6$ .................................................. D04D 7/10
[52] U.S. Cl. ............................ 428/4; 428/352; 428/906
[58] Field of Search ............................ 428/4, 5, 352, 428/906

[56] References Cited

U.S. PATENT DOCUMENTS

| | | | |
|---|---|---|---|
| 1,276,731 | 8/1918 | Crowell | 428/906 X |
| 2,072,095 | 3/1937 | Cohn | 428/906 X |
| 2,153,310 | 4/1939 | Newman | 24/17 R |
| 2,248,317 | 7/1941 | Van Cleef | 428/40 X |
| 2,278,673 | 4/1942 | Savada et al. | 428/42 |
| 2,450,083 | 9/1948 | Donaldson | 428/40 |
| 2,586,039 | 2/1952 | Heggdal | 428/79 X |
| 2,626,883 | 1/1953 | Boese | 428/4 X |
| 2,641,562 | 6/1953 | Chartrand et al. | 428/352 X |
| 2,880,862 | 4/1959 | Sermattei | 428/40 |
| 3,241,662 | 3/1966 | Robinson et al. | 428/343 |
| 3,256,129 | 6/1966 | Wallerstein et al. | 428/5 |
| 3,447,954 | 6/1969 | Lohse | 427/208.2 |
| 3,475,259 | 10/1969 | Meserole | 428/352 X |
| 3,691,140 | 9/1972 | Silver | 526/240 |
| 3,857,731 | 12/1974 | Merrill, Jr. et al. | 428/314.4 |
| 3,922,407 | 11/1975 | Nimmo et al. | 428/5 |
| 4,138,527 | 2/1979 | Malek | 428/425.1 X |
| 4,151,319 | 4/1979 | Sackoff et al. | 428/40 |
| 4,421,817 | 12/1983 | Pina et al. | 428/207 |
| 4,576,854 | 3/1986 | Kurahashi | 428/906 X |
| 4,585,676 | 4/1986 | De Smet et al. | 428/5 |
| 4,634,612 | 1/1987 | Nelson et al. | 428/114 X |
| 4,670,012 | 6/1987 | Johnson | 604/389 X |
| 4,680,210 | 7/1987 | Corcoran | 428/42 |
| 4,696,854 | 9/1987 | Ethier | 428/284 X |
| 4,708,907 | 11/1987 | Flutti et al. | 428/352 |
| 4,713,267 | 12/1987 | Truskolaski | 428/4 |
| 4,781,306 | 11/1988 | Smith | 428/206 X |
| 4,826,712 | 5/1989 | Theno . | |

OTHER PUBLICATIONS

Exhibit A–Examiners Paper No. 2 dated Jul. 26, 1987.
Exhibit B–Examiner Interview Summary Record dated Aug. 5, 1987.
Exhibit C–Amendment dated Oct. 26, 1987.
Exhibit D–Supplementary Response dated Jan. 7, 1986.
Exhibit E–Examiner's Paper No. 6 dated Jan. 27, 1988.
Exhibit F–Examiner's Paper No. 8 dated Feb. 17, 1988.
Exhibit G–Affidavit of Mark H. Theno dated Jun. 27, 1988.
Exhibit H–Amendment dated Jun. 30, 1988.
Exhibit I–Examiner's Paper No. 15 dated Aug. 28, 1988.
Exhibit J–Examiner's Paper No. 16 dated Dec. 6, 1988.
Exhibit K–Amendment Under Rule 1.116 dated Dec. 7, 1988.
Exhibit L–Examiner's Paper No. 18 dated Dec. 20, 1988.
Exhibit M–Notice of Allowance and Issue Fee Due dated Dec. 20, 1988.

*Primary Examiner*—Henry F. Epstein

[57] ABSTRACT

A decorative gift wrapping ribbon having a top decorative surface and a lower surface containing a layer of pressure-sensitive adhesive with the pressure-sensitive adhesive having sufficient adhesive strength to prevent accidental displacement of the ribbon on the package, yet having sufficient lack of adhesiveness so that if the ribbon is positioned improperly it can be correctly repositioned on the package without tearing the package.

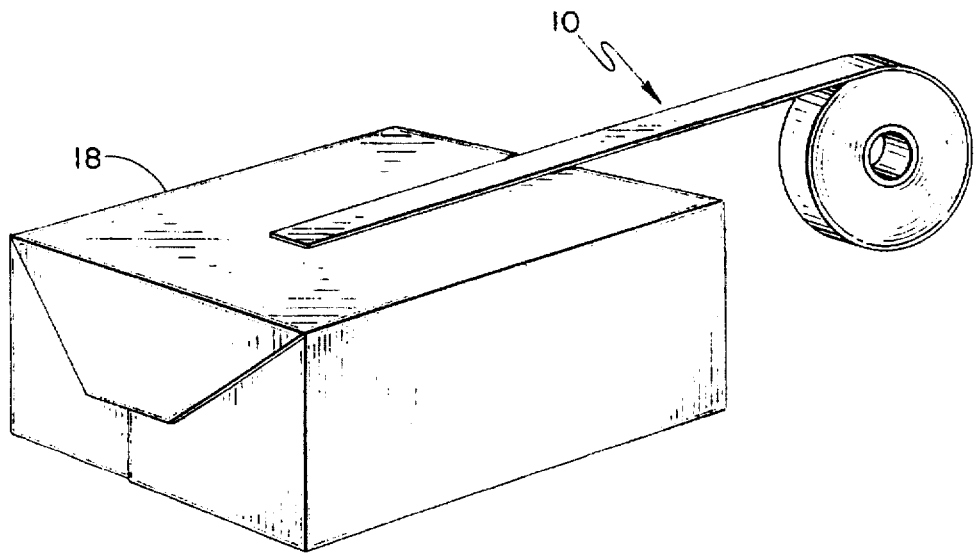

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–7 are cancelled.

* * * * *